United States Patent
Berisha et al.

(10) Patent No.: US 8,551,205 B2
(45) Date of Patent: Oct. 8, 2013

(54) GAS FILTER INSERT

(75) Inventors: Bashkim Berisha, Leonberg (DE); Matthias Stegmüller, Sindelfingen (DE); Jürgen Stehlig, Neckartenzlingen (DE); Hans Waibel, Remseck/Aldingen (DE)

(73) Assignee: Mahle International GmbH (DE)

( * ) Notice: Subject to any disclaimer, the term of this patent is extended or adjusted under 35 U.S.C. 154(b) by 591 days.

(21) Appl. No.: 12/601,115

(22) PCT Filed: May 8, 2008

(86) PCT No.: PCT/EP2008/055684
§ 371 (c)(1),
(2), (4) Date: Nov. 20, 2009

(87) PCT Pub. No.: WO2008/141945
PCT Pub. Date: Nov. 27, 2008

(65) Prior Publication Data
US 2010/0154369 A1   Jun. 24, 2010

(30) Foreign Application Priority Data
May 23, 2007   (DE) .................. 10 2007 024 287

(51) Int. Cl.
| | | |
|---|---|---|
| *B01D 39/14* | (2006.01) | |
| *B01D 24/00* | (2006.01) | |
| *B01D 39/06* | (2006.01) | |
| *B01D 39/00* | (2006.01) | |
| *B01D 46/00* | (2006.01) | |
| *B01D 47/00* | (2006.01) | |
| *B01D 53/00* | (2006.01) | |

(52) U.S. Cl.
USPC ............... 55/493; 55/522; 55/523; 55/524

(58) Field of Classification Search
USPC ........................... 55/522–524, 493
See application file for complete search history.

(56) References Cited

U.S. PATENT DOCUMENTS

| | | | | |
|---|---|---|---|---|
| 2,427,733 A | * | 9/1947 | McCann | 210/489 |
| 3,382,651 A | * | 5/1968 | Hahl et al. | 55/337 |

(Continued)

FOREIGN PATENT DOCUMENTS

| | | |
|---|---|---|
| DE | 2312794 | 9/1974 |
| DE | 2819177 | 11/1978 |

(Continued)

OTHER PUBLICATIONS

Ammon et al., English Translation of "Annular gas filter insert exchangeably inserted into filter housing for air suction filter of vehicle combustion engine comprises annular region penetrated by opening for introducing and removing unfiltered and filtered gases", Jan. 13, 2005, Germany.*

(Continued)

*Primary Examiner* — Amber Orlando
(74) *Attorney, Agent, or Firm* — Rader, Fishman & Grauer PLLC (57) ABSTRACT

The invention relates to a gas filter insert (1), particularly an air filter insert for a fresh air system of an internal combustion engine, having a filter body (2) which extends in its longitudinal direction (4) in a U-shape around an inner chamber (5), and having a connector (3) which communicates with the inner chamber (5) and is arranged on the filter body on the open end-face side (7) thereof. In order to simplify the construction of the filter insert (1), the filter body (2) is sealed transversally to its longitudinal direction (4), with an end plate (9) on at least one end side (8).

13 Claims, 6 Drawing Sheets

(56) References Cited

U.S. PATENT DOCUMENTS

| | | | |
|---|---|---|---|
| 3,641,744 A * | 2/1972 | Culbert et al. | 55/319 |
| 3,724,665 A * | 4/1973 | Hall | 210/130 |
| 3,830,042 A | 8/1974 | MacDonnell | |
| 4,222,755 A * | 9/1980 | Grotto | 55/291 |
| 4,283,207 A | 8/1981 | Martyniuk | |
| 4,304,580 A * | 12/1981 | Gehl et al. | 55/482 |
| 4,331,459 A | 5/1982 | Copley | |
| 4,464,261 A | 8/1984 | Cullen et al. | |
| 4,482,368 A * | 11/1984 | Roberts | 55/480 |
| 4,498,989 A * | 2/1985 | Miyakawa et al. | 210/450 |
| 4,619,673 A | 10/1986 | Cullen et al. | |
| 4,640,698 A | 2/1987 | Ohishi et al. | |
| 4,692,177 A | 9/1987 | Wright et al. | |
| 4,758,256 A * | 7/1988 | Machado | 55/498 |
| 5,034,037 A | 7/1991 | Harold et al. | |
| 5,064,458 A * | 11/1991 | Machado | 55/482 |
| 5,320,752 A | 6/1994 | Clack et al. | |
| 5,391,212 A | 2/1995 | Ernst et al. | |
| 5,423,984 A * | 6/1995 | Belden | 210/232 |
| 5,814,118 A * | 9/1998 | Wickland et al. | 55/385.4 |
| 5,985,142 A * | 11/1999 | Belden | 210/232 |
| 6,345,721 B1 * | 2/2002 | Durre et al. | 210/440 |
| 6,540,806 B2 * | 4/2003 | Reinhold | 55/490 |
| 2003/0110792 A1 | 6/2003 | Bandi | |
| 2005/0039601 A1 * | 2/2005 | Kosmider et al. | 95/273 |
| 2005/0081497 A1 * | 4/2005 | Connor et al. | 55/493 |
| 2007/0227955 A1 * | 10/2007 | Walde et al. | 210/109 |
| 2010/0154369 A1 | 6/2010 | Berisha et al. | |

FOREIGN PATENT DOCUMENTS

| | | |
|---|---|---|
| DE | 2819177 A1 | 11/1978 |
| DE | 3518076 A1 | 11/1985 |
| DE | 4219396 A1 | 12/1993 |
| DE | 10328002 | 1/2005 |
| DE | 10328002 A1 | 1/2005 |
| EP | 2152385 A1 | 2/2010 |
| GB | 893601 A | 4/1962 |
| GB | 1588578 | 4/1981 |
| GB | 1588578 A | 4/1981 |
| GB | 2162087 | 1/1986 |
| GB | 2162087 A | 1/1986 |
| JP | 57-018451 | 1/1982 |
| WO | WO-01/02080 A1 | 1/2001 |
| WO | WO-2008/141945 A1 | 11/2008 |

OTHER PUBLICATIONS

English abstract for DE-4218396, Dec. 16, 1993.
EP opposition for EP2152385, Feb. 17, 2010.
English abstract for DE-10328002, Jan. 13, 2005.
English abstract for JP-57-018451, Jan. 30, 1982.

* cited by examiner

GAS FILTER INSERT

CROSS-REFERENCES TO RELATED APPLICATION

This application is a National Stage application which claims the benefit of International Application No. PCT/EP2008/055684 filed May 23, 2007, which claims priority based on German Application No. 10 2007 024 287.7, filed May 8, 2008, both of which are hereby incorporated by reference in their entirety.

The present invention relates to a gas filter insert, in particular an air filter insert for a fresh air system of an internal combustion engine, having the features of the preamble of claim 1. The invention furthermore relates to a gas filter equipped with such a filter insert.

TECHNICAL FIELD

Document DE 103 28 002 A1 discloses a gas filter insert having a filter member and a connection. The filter member extends in its longitudinal direction in a "U"-shaped manner around an interior chamber. The connection communicates with the interior chamber and is arranged on the filter member on its open front face.

BACKGROUND

In known gas filter inserts, the filter member is sealed on its end sides transversely to its longitudinal direction in such a manner that the folded sheet material forming the filter member is configured in the region of these end sides to be correspondingly airtight, for example the end edges can be welded. In the known gas filter inserts, a sealing is provided on the end sides of the filter member on an edge that is adjacent the interior chamber, said sealing acting together with a housing, in the assembled state, in order to separate in the housing a crude chamber from a pure chamber.

The present invention addresses the problem of providing an improved or at least a different embodiment of a gas filter insert of the previously mentioned type, said improvement or different embodiment being characterised by a simplified and thus more economical configuration.

This problem is solved according to the invention by the subject matter of the independent claims. Advantageous embodiments are the subject matter of the dependent claims.

SUMMARY

The invention is based on the general concept of realising the sealing of the filter member transversely to a longitudinal direction at least on one end side by means of an end plate. By means of such an end plate, the respective filter material forming the filter member can be sealed in its entirety on the end side concerned, by means of which a comparably expensively manufactured sealing of the filter material, even just in the region of the respective end side, can be dispensed with. For example, all end edges of the filter material can be sealed on the respective end side with the respective end plate. The sealing of the filter member on the respective end side can be realised by means of the used end plate, in that, for example, the filter member is encased in plastic in the end plate on the end side concerned or is adhered to the end plate by means of using a suitable adhesive material or is welded to the end plate. By using the at least one end plate, the stability of the filter insert can moreover be improved, which can resultantly introduce in particular an increased operational reliability with regard to the sealing in the assembled state.

It is preferred that the filter member is sealed on both end side respectively with such an end plate.

According to a particularly advantageous embodiment, the respective end plate can be configured as closed, particularly in such a manner that it seals the interior chamber of the respective end side of the filter member at least in the assembled state. With this manner of construction, an additional sealing attached to the filter member or to the respective end plate can be dispensed with. In particular, the separation of a pure chamber from a crude chamber occurs in such a manner substantially exclusively by means of the filter insert, without necessitating the co-operation with the housing of the associated gas filter in the assembled state. This increases the operational reliability of the gas filter even with relatively large production tolerances.

Additional important features and advantages of the invention can be found in the dependent claims, in the drawings, and in the pertinent description of the figures with reference to the drawings.

It is understood that the features described above and those to be described in what follows can be used not only in the particular cited combination; but also in other combinations or independently without departing from the scope of the present invention.

Preferred embodiments of the invention are shown in the drawings and are described in more detail in the following description, the same reference numerals referring to components which are the same or functionally the same or similar.

BREIF DESSCRIPTION OF THE DRAWING

It is schematically shown in

DETAILED DESCRIPTION

Corresponding to the FIGS. 1 to 9, a gas filter insert 1 comprises a filter member 2 and a connection 3. The filter member 2 extends in a longitudinal direction 4 indicated by a dot and dash line in FIG. 1 in a substantially "U"-shape around an interior chamber 5. The filter member 2 preferably consists of a suitable filter material 6 that in particular can be folded or pleated in a zigzag manner. The filter member 2 has an open front face 7 because of its "U" shape.

Figure 1:
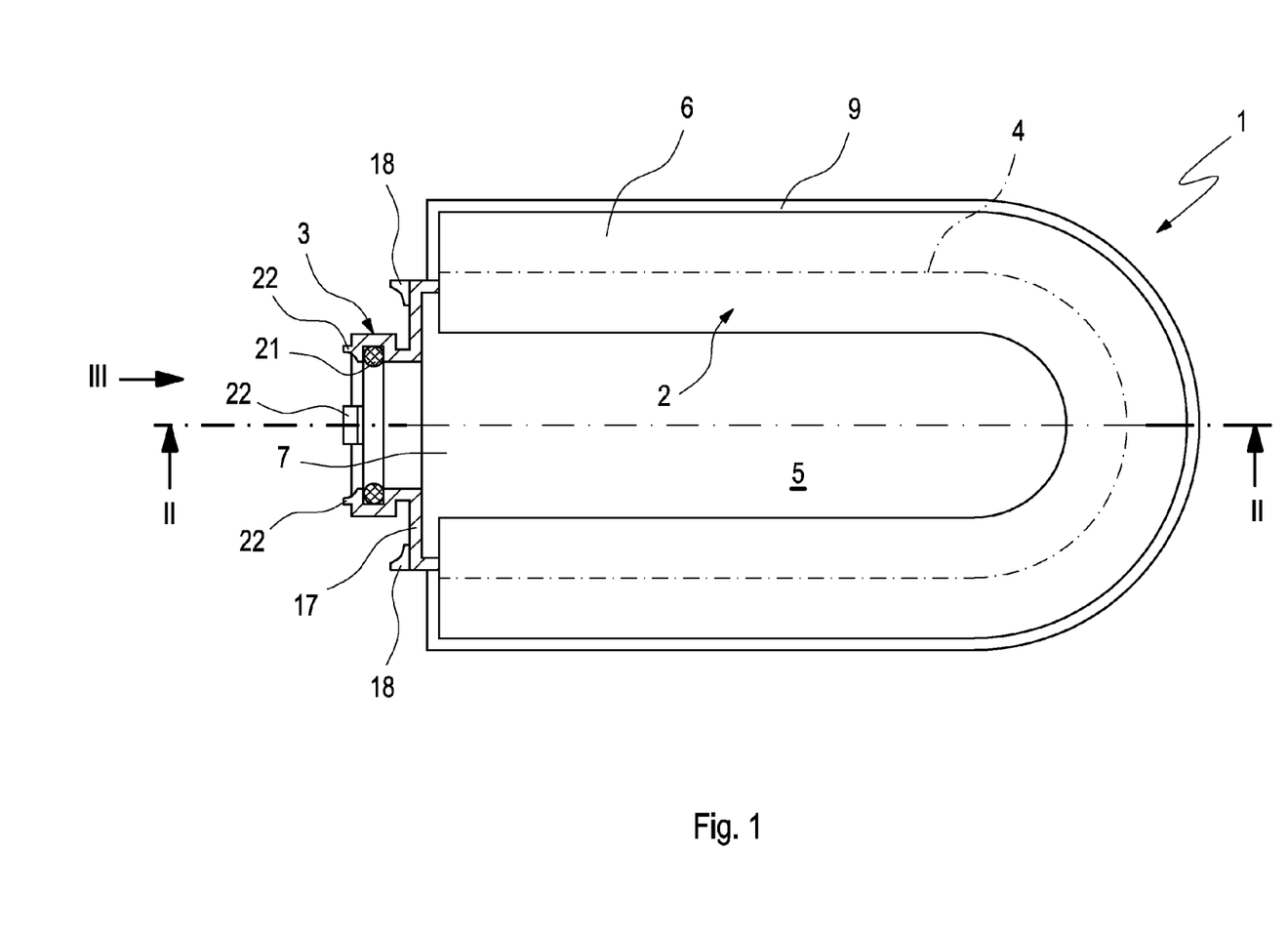
FIG. 1 a very simplified longitudinal cross-section of a gas filter insert corresponding to the line of intersection I in FIG. 2, FIG. 2 a section view of the gas filter insert corresponding to the line of intersection II in FIG. 1, FIG. 3 a view of the gas filter insert corresponding to a viewing direction III in the FIGS. 1 and 2, FIGS. 4-6 an enlarged detail view of an end plate of the gas filter insert in a different embodiments and/or in different section of the end plate, FIGS. 7+8 section view as in FIG. 2, however only in the region of a connection, in different embodiments, FIG. 9 a longitudinal cross-section as in FIG. 1 of a gas filter.

The connection 3 communicates with the interior chamber 5 and is arranged on the open front face 7 of the filter member 2.

The filter member 2 has an end side 8 transverse to its longitudinal direction 4. The filter member 2 is sealed with an end plate 9 on at least one of these end sides 8. In the embodiment shown here, the filter member 2 is respectively sealed on both end sides 8 with such an end plate 9. In theory, however, an embodiment is also conceivable in which the filter member 2 is sealed only in the region of one of its end sides 8 with such an end plate 9.

The sealing of the respective end sides 8 of the filter member 2 by means of the respective end plates 9 can preferably be realized in that the filter member 2 along with its end side 8 is encased in plastic in the respective end plate 9. Alternatively, it is likewise possible to weld or adhere the filter member 2 to the respective end side 8 with the respective end plate 9.

Figure 4:
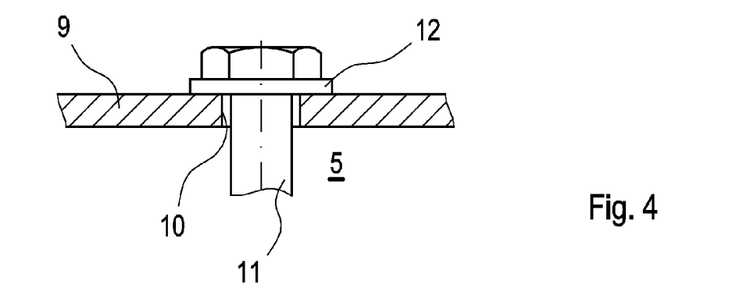

In the preferred embodiment shown here, the respective end plate 9 is configured as closed. It is thereby achieved that the interior chamber 5 on the respective end side 8 of the filter member 2 is closed, thereby making it possible to dispense with additional sealing measures. In order to make reaching or removal from the interior chamber 5 possible, the respective gas must penetrate the filter member 2 with a closed end plate 9. It is not excluded that the respectively closed end plate 9 corresponding to figure can contain at least one opening 10. However, in the assembled state of the gas filter insert 1, said opening is closed in a sealed manner by means of a fastening element 11. The fastening element 11 is here formed by a screw that is supported on the end plate 9 by a sealing disc 12, which thereby closes the opening 10 in a sealed fashion.

Figure 5:
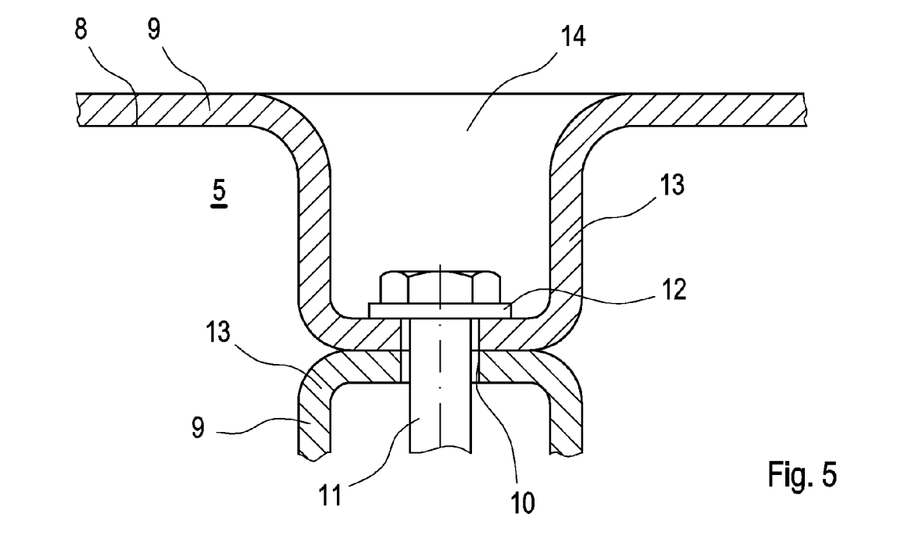

Additionally or alternatively, the respectively closed end plates 9 according to FIG. 5 can have at least one hollow foot 13. This hollow foot 13 protrudes into the interior chamber 5 and is open in the region of the respective end side 8 of the filter member 2. The corresponding open side is characterised with reference numeral "14" in FIG. 5. The foot 13 can, for example, be used to support the one end plate 9 on a housing or on the other end plate 9, either directly or, as is indicated in FIG. 5, or by means of a corresponding foot 13 of the other end plate 9. The foot 13 likewise can be used to fasten the gas filter insert 1 in the assembled state through an opening 10 by means of a corresponding fastening element 11. The stability of the gas filter insert 1 can be considerably improved by means of the supported foot 13.

Although the respective end plate 9 cannot be entirely closed in the unassembled state by means of such an opening 10 or by means of such a foot 13 that likewise can contain such an opening 10, it can sufficiently seal in a gas-tight manner the interior chamber 5 in the assembled state since the respective opening 10 in the assembled state is closed in a sealed manner by, for example, a corresponding fastening element 11.

Figure 6:
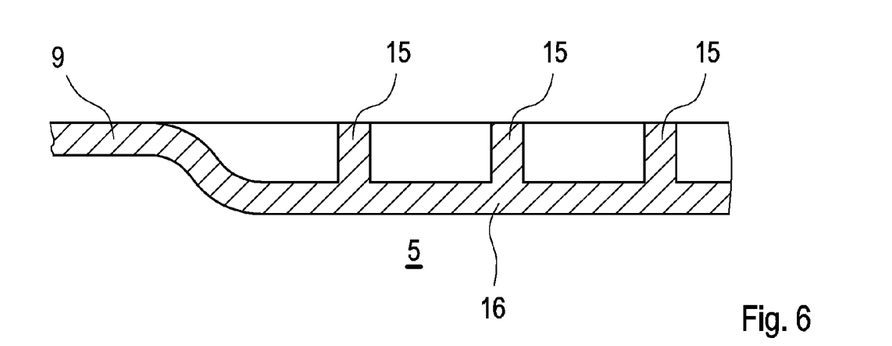

The stability of the respective end plate 9 can also be increased by the formation of ribs 15, as in FIG. 6. These can preferably be configured in a recess 16, which is set back, of the respective end plate 9 in the direction of the interior chamber 5 and be substantially flush with the remaining exterior side of the end plate 9.

Figure 2:
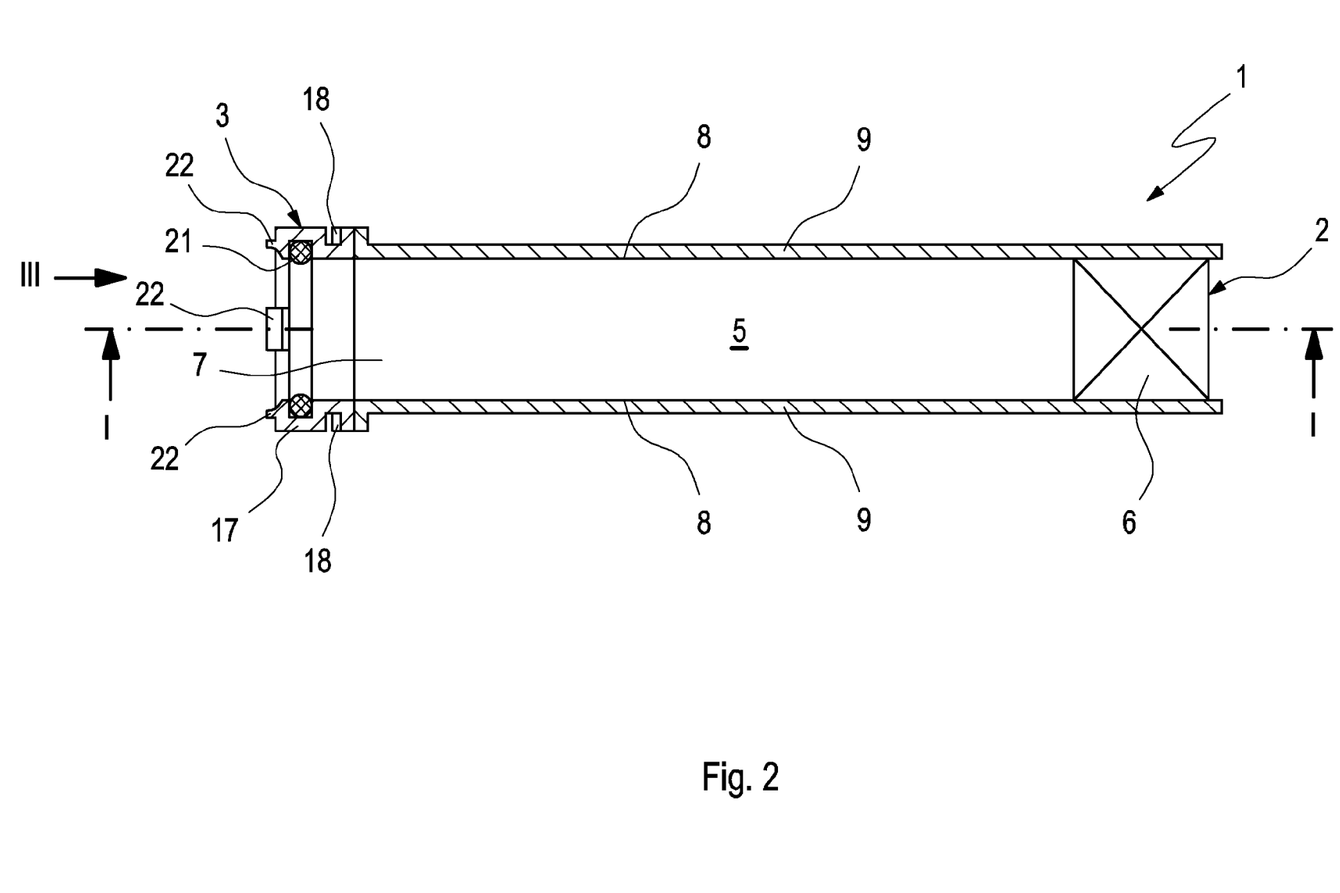
Figure 3:
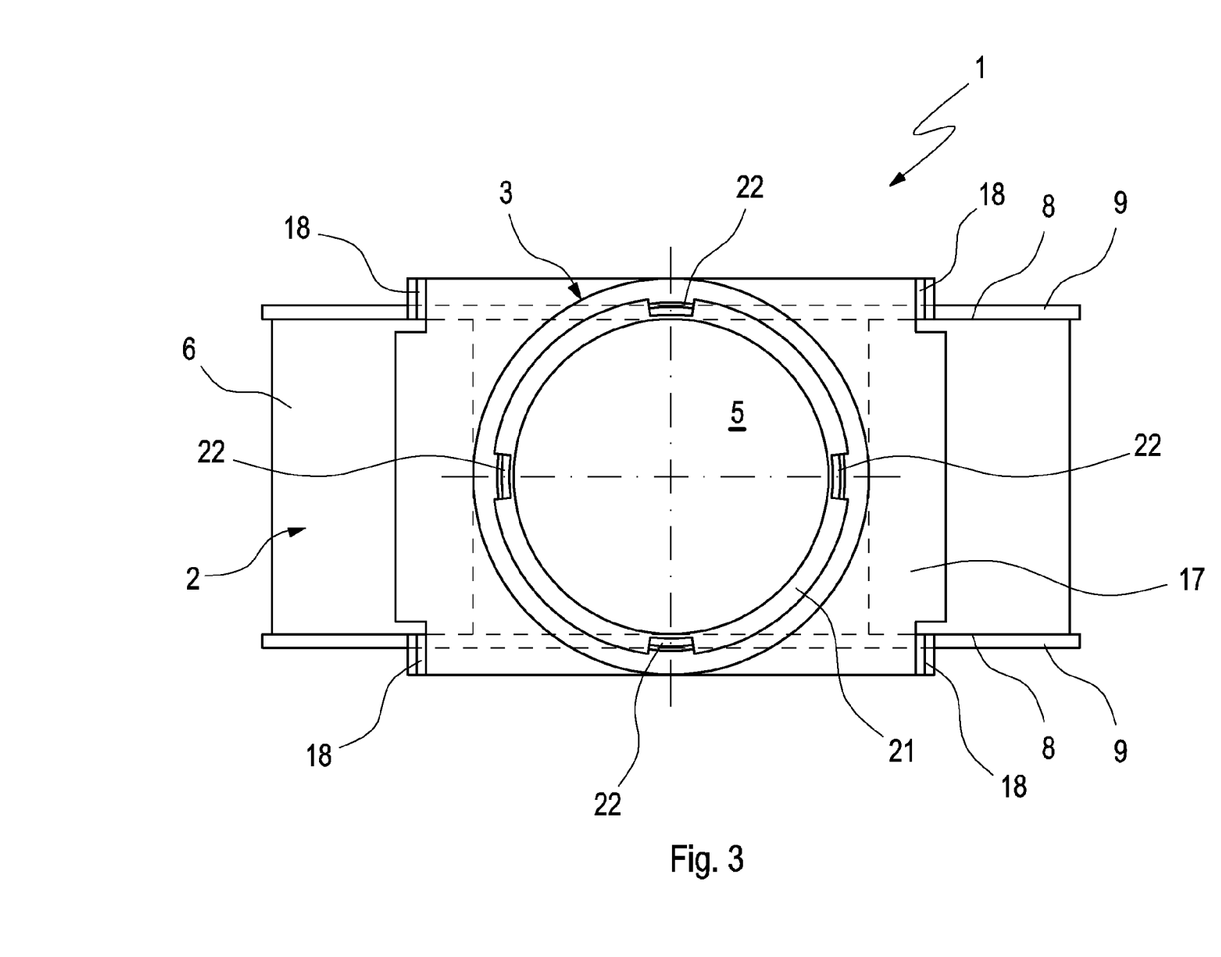

At least corresponding to the FIGS. 1 to 3, the connection 3 in this preferred embodiment is configured on a front plate 17. This front plate 17 is then arranged on the open front face 7 of the filter member 2. The front plate 17 can be attached to the filter member 2 of the respective end plate 9. The front plate 17 is connected on the front ends of the "U" bracket of the filter member 2 therewith or by means of the filter material of the filter member 2. For example, the front plate 17 can be adhered to the filter member 2 and the end plates 9 on the front face. It is also likewise possible in principle to weld or to connect by means of encasing in plastic the front plate 17 to the respective end plate 9 and/or to the filter member 2.

It is preferred to manufacture integrally the connection 3 with the associated front plate 17 out of one piece as an injection-moulded part, for example.

The front plate 17 can be clipped with the respective end plate 9, corresponding to the embodiment shown in FIGS. 1 to 3. Correspondingly, the clips configured on the end plate 9 are characterised with reference numeral "18".

Notable here is a special embodiment in which the front plate 17 is not only clipped to the respective end plate 9 but is also adhered to the respective end plate 9 as well as to the filter member 2. This embodiment is characterised by its simplicity to manufacture. During the hardening process of the adhesive material, the clipping of an adequate position fixation and the pressing of the front plate 17 on the respective end plate 9 as well as on the filter member 2. Subsequent to the hardening of the adhesive, the clipping is no longer necessary in and of itself.

Figure 7:
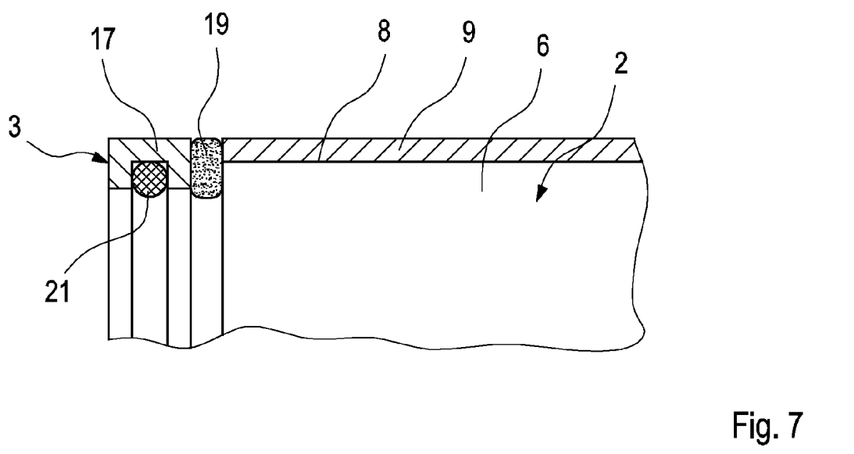

FIG. 7 shows an embodiment in which the connection 3 or the optionally present front plate 17 is foamed onto the filter member 2 and onto the respective front face of the end plate 9. A corresponding foam is characterised in FIG. 7 with reference numeral "19". A foam 19 correspondingly suited therefor can have, for example, closed pores and can consist of polyurethane, for example.

Figure 8:
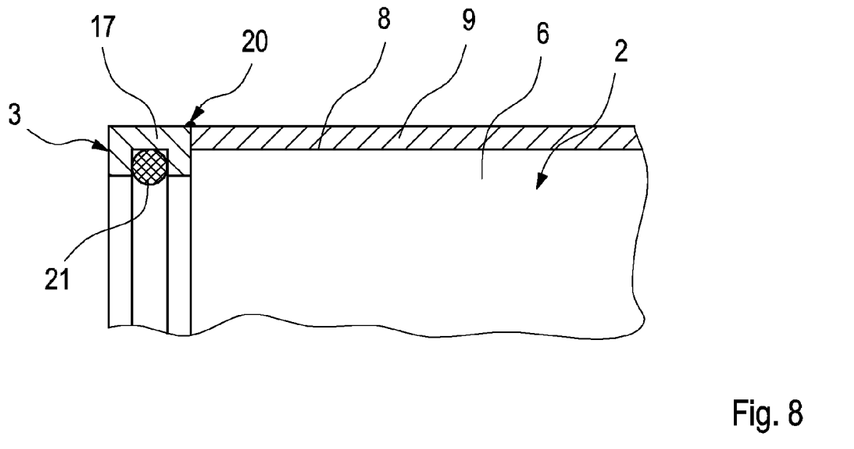

FIG. 8 shows an embodiment in which the front plate 17 and at least one of the end plates 9 are manufactured from one integral piece. For example, the respective end plates 9 and the front plate 17 can be injection moulded in one injection mould as a common component. The front plate 17 and the respective end plate 9 can be connected one to the other, in particular by means of an integral hinge 20. In this manner, the injection-moulding process or the tools necessary therefor can be simplified. The one-component configuration can offer advantages with regard to assembly.

The connection 3 is configured here in such a manner that it can hold a radial sealing 21, in particular an "O"-ring seal. Corresponding hooks 22 are configured for this purpose, said hooks being arranged distributed in the circumferential direction and that radially engage in segments the respective radial sealing 21 in order to position it in its position.

Figure 9:
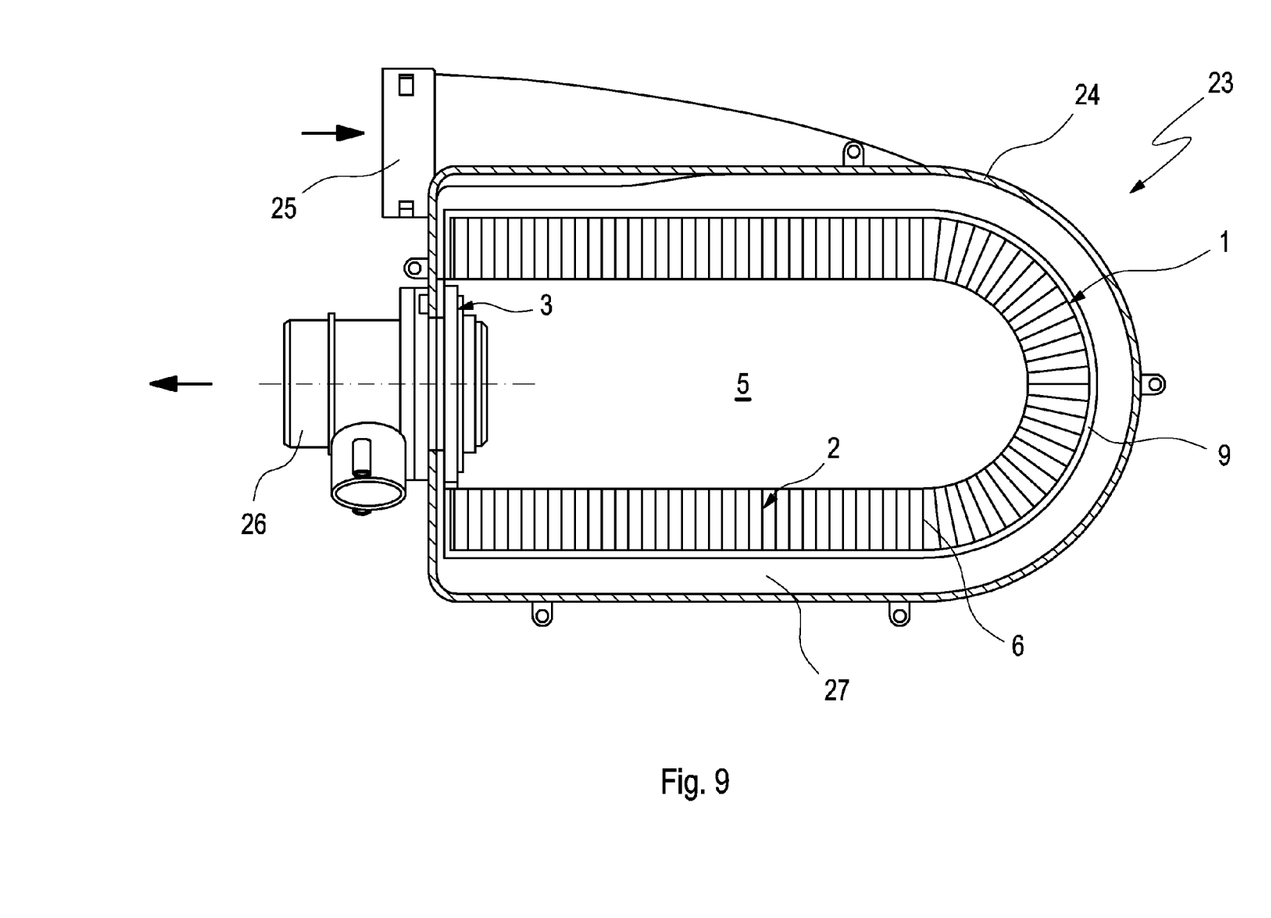

Corresponding to FIG. 9, a gas filter 23 comprises a housing 24 and a gas filter insert 1 of the previously-described type. The housing 24 has an inlet 25 on the crude side and an outlet 26 on the pure side. The gas filter insert 1 is inserted into the housing 24 in the assembled state and thereby separates a crude chamber from a pure chamber. In the example shown, the connection 3 of the gas filter insert 1 is connected to the outlet 26. Accordingly, an interior chamber 27 of the housing 24 forms the crude chamber, while the interior chamber 5 of the filter insert 1 forms the pure chamber. It is evident that in theory, a direction of flow in the reverse direction can also be present.

The gas filter 23 or the gas filter insert 1 are preferably configured as an air filter or an air filter insert and can be used, for example, in a fresh air system of an internal combustion engine, which can be arranged in a motor vehicle, in particular.

The invention claimed is:
1. A gas filter insert comprising:
a filter member extending longitudinally in a "U"-shape about an interior chamber; and
a connection that communicates with the interior chamber, wherein the connection is arranged on the filter member on an open front side,
wherein the filter member is sealed on a pair of end sides with a respective one of first and second end plates,
wherein the first end plate is closed in order to close the interior chamber on one end side of the filter member at least in the assembled state, wherein the second end plate is closed in order to close the interior chamber on the other end side of the filter member at least in the assembled state, wherein the first and second end plates are separate components, wherein the first closed end plate includes at least one hollow foot that protrudes into the interior chamber and the first end plate is supported on the second end plate at least either directly or indirectly by at least one corresponding foot configured on the second end plate, and wherein the connection is configured on a front plate that is a separate component with respect to the first and second end plates and is not an integral portion of the first and second end plates, and the front plate is at least connected to one of the first and second end plates by an integral hinge.

2. The gas filter insert as specified in claim 1, wherein the first end plate contains at least one opening that is sealed by a fastening element.

3. The gas filter insert as specified in claim 1, wherein the at least one hollow foot is open in a region of at least one end side of the filter member.

4. The gas filter insert as specified in claim 1, wherein the pair of end sides of the filter member is at least one of encased in plastic in the first and second end plates, is welded onto the first and second end plates and is adhered onto the first and second end plates.

5. The gas filter insert as specified in claim 1, wherein the front plate is clipped to the first and second end plates.

6. The gas filter insert as specified in claim 1, wherein the front plate is adhered to the first and second end plates and to the filter member.

7. The gas filter insert as specified in claim 1, wherein at least one of the connection and the front plate is formed onto the filter member and onto the first and second end plates.

8. The gas filter insert as specified in claim 2, wherein the at least one hollow foot is open in a region of at least one end side of the filter member.

9. The gas filter insert as specified in claim 2, wherein the pair of end sides of the filter member is at least one of encased in plastic in the first and second end plates, is welded onto the first and second end plates and is adhered onto the first and second end plates.

10. The gas filter insert as specified in claim 2, wherein the front plate is clipped to the first and second end plates.

11. The gas filter insert as specified in claim 2, wherein the front plate is adhered to the first and second end plates and to the filter member.

12. The gas filter insert as specified in claim 2, wherein the connection and the front nlate is formed onto the filter member and onto the first and second end plates.

13. The gas filter insert as specified in claim 1, wherein an entirety of a respective one of the first and second end plates is planar.

* * * * *

UNITED STATES PATENT AND TRADEMARK OFFICE
CERTIFICATE OF CORRECTION

| | |
|---|---|
| PATENT NO. | : 8,551,205 B2 |
| APPLICATION NO. | : 12/601115 |
| DATED | : October 8, 2013 |
| INVENTOR(S) | : Berisha et al. |

It is certified that error appears in the above-identified patent and that said Letters Patent is hereby corrected as shown below:

In the Claims:

At column 6, line number 23, please correct the misspelled word "nlate" to "plate"

Signed and Sealed this
Twenty-fourth Day of February, 2015

Michelle K. Lee
*Deputy Director of the United States Patent and Trademark Office*